United States Patent
Holloway

[11] Patent Number: 5,647,389
[45] Date of Patent: Jul. 15, 1997

[54] INDEXABLE LATCHING HANDLE ASSEMBLY FOR QUARTER-TURN ROTARY VALVES

[75] Inventor: David G. Holloway, Deerfield, N.H.

[73] Assignee: Parker & Harper Companies, Inc., Raymond, N.H.

[21] Appl. No.: 382,574

[22] Filed: Feb. 2, 1995

[51] Int. Cl.⁶ .................. F16K 35/02; F16K 31/60; F16K 35/06
[52] U.S. Cl. .................. 137/15; 137/270; 137/315; 251/90; 251/95; 251/109; 251/286
[58] Field of Search .................. 70/175, 176, 177, 70/178, 209, 210, 211; 137/15, 385, 315, 270; 251/90, 95, 98, 99, 103, 104, 108, 109, 116, 285, 286, 288, 93

[56] References Cited

U.S. PATENT DOCUMENTS

| | | | |
|---|---|---|---|
| 961,466 | 6/1910 | Shade | 251/109 |
| 3,228,415 | 1/1966 | Geiss | 251/101 |
| 3,311,128 | 3/1967 | Taylor | 251/98 |
| 3,329,394 | 7/1967 | Overbaugh | 251/99 |
| 3,355,141 | 11/1967 | Cooper | 251/101 |
| 3,537,473 | 11/1970 | DeZurik, Jr. | 251/101 |
| 3,679,170 | 7/1972 | Bernas | 251/104 |
| 3,858,843 | 1/1975 | Hartmann | 251/99 |
| 4,456,219 | 6/1984 | Scott et al. | 251/99 |
| 4,559,966 | 12/1985 | Massey et al. | 137/270 |
| 4,570,901 | 2/1986 | Holtgraver | 251/98 |
| 4,747,427 | 5/1988 | Smith et al. | 251/101 |
| 4,815,693 | 3/1989 | James | 251/95 |
| 4,909,275 | 3/1990 | Massey et al. | 251/95 |
| 4,944,325 | 7/1990 | Baldwin et al. | 251/109 |
| 5,029,808 | 7/1991 | McCauley | 251/95 |
| 5,072,913 | 12/1991 | Carroll et al. | 251/99 |
| 5,188,335 | 2/1993 | Pettinaroli | 251/95 |

FOREIGN PATENT DOCUMENTS 2032579  5/1980  United Kingdom .................. 251/99

*Primary Examiner*—George L. Walton
*Attorney, Agent, or Firm*—Davis and Bujold

[57] ABSTRACT

An indexable latching handle assembly for quarter-turn rotary valves which permits the arc of operation to be oriented as necessary to avoid surrounding obstacles and enhance ease of operation. This handle assembly has a latching device capable of latching the valve in the closed position or in the open position and is readily disengaged without regard to the orientation of the handle on the valve.

20 Claims, 5 Drawing Sheets

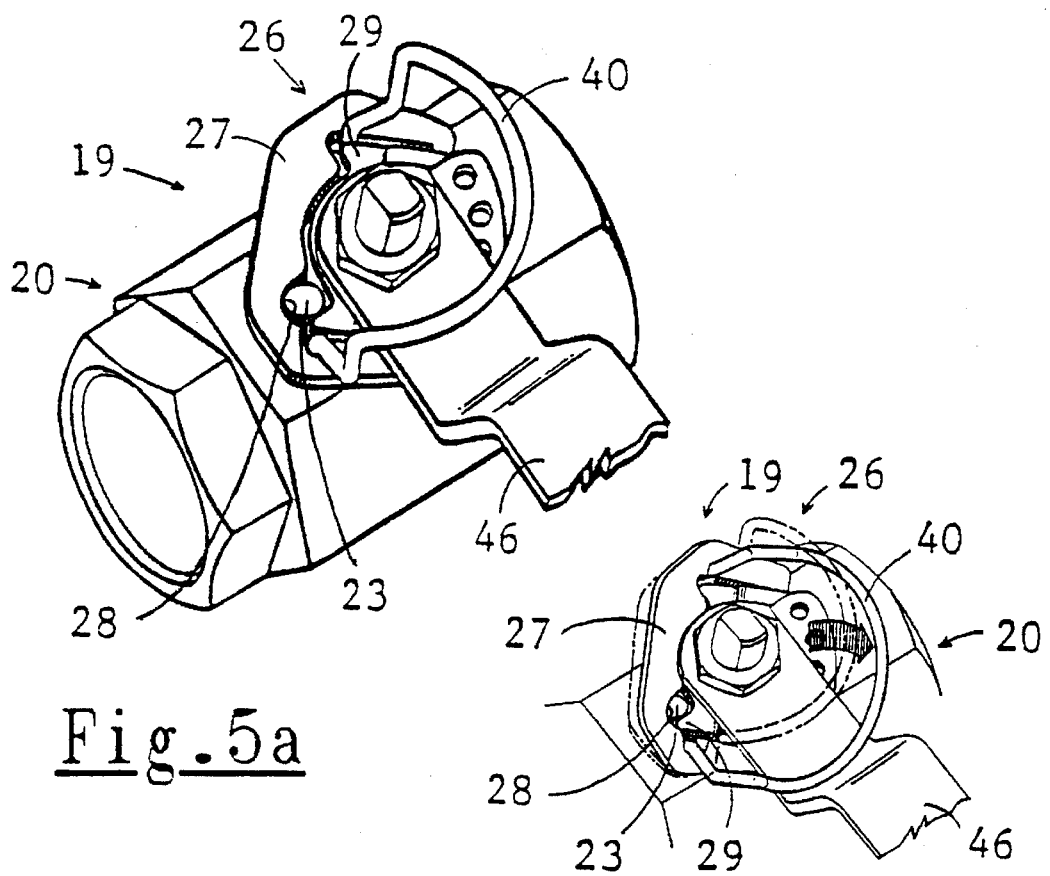
Fig. 5a
Fig. 5b
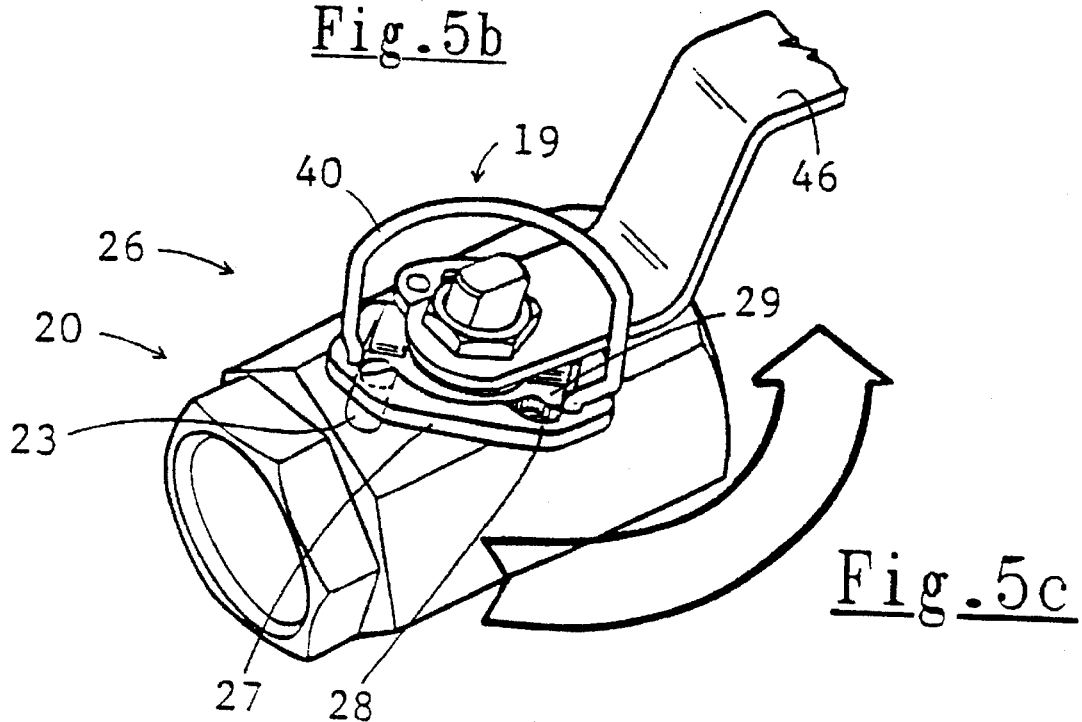
Fig. 5c

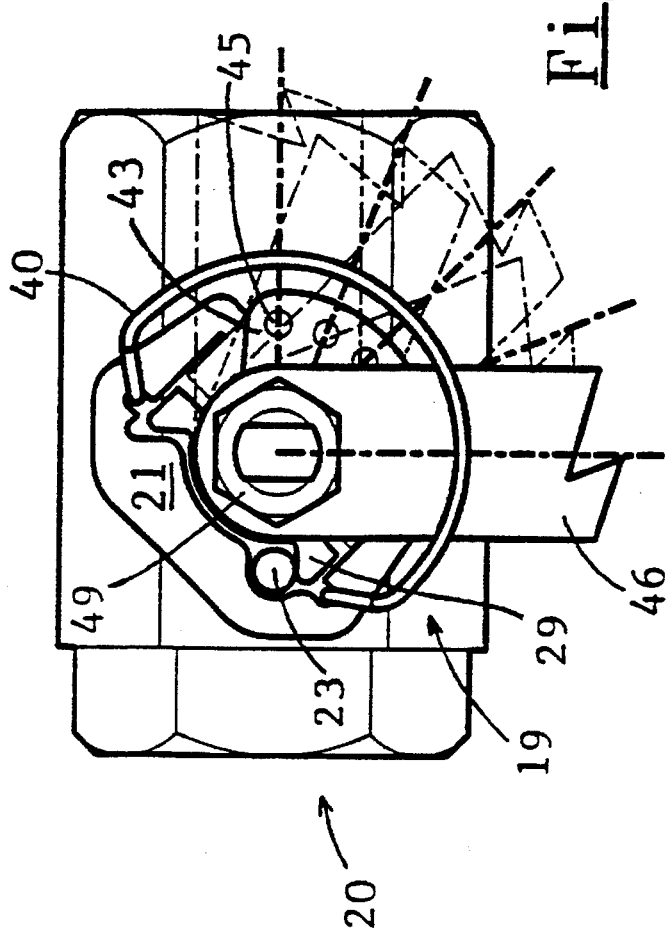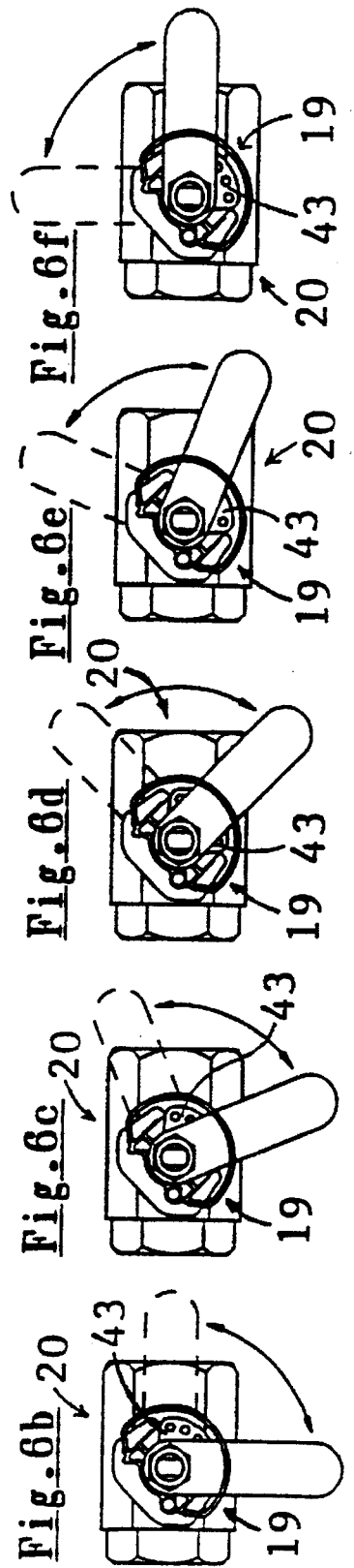

INDEXABLE LATCHING HANDLE ASSEMBLY FOR QUARTER-TURN ROTARY VALVES

This invention relates to an indexable latching handle assembly for quarter-turn rotary valves. In particular, though not exclusively, the invention provides an indexable handle assembly which permits the arc of operation to be oriented as necessary to avoid surrounding obstacles and enhance ease of operation. The handle assembly also comprises a latching assembly capable of latching the valve in the closed position or in the open position and is readily disengaged without regard to the orientation of the handle on the valve.

BACKGROUND OF THE INVENTION

Installations of lever operated quarter-turn rotary valves in which space is restricted often require the repositioning of the valve operating handle at an angle to its customary position in order to avoid interference with other components. The space allotted to the installed valves must, of course, provide clearance not only for the handle's travel but room for the operator's hand as well.

These reorientations include cases wherein the handle serves in a wholly different quadrant, cases in which the sense of operation is reversed (e.g. the conventional "clockwise-to-close" becomes "clockwise-to-open"), as well as cases where the handle is displaced only through a small angle.

It is not uncommon to find within a given piece of equipment valves having several different handle reorientations to suit the available space at the locations in which each is installed. As a consequence, valve manufacturers are called upon to supply a large variety of special handles; a circumstance which adds expense to the product and to a confusing proliferation of single-purpose parts in both the manufacturer's and the user's inventory.

To compound the problems presented by the need to reorient valve handles, there often exists the additional requirement that a valve be equipped with a latching device to prevent inadvertent operation. Currently available off-the-shelf latching devices invariably are integral with their associated standard handles indexed to fixed stops on the valve body. To modify one of these standard handle/latches each time an equipment designer confronts a new space limitation is highly impractical.

To answer the need for a latching function for use with valves having reoriented handles, manufacturers turn to such expedients as fixing a spring-loaded plunger to the handle, sited so as to engage the stops on the valve body while permitting the handle to operate in the desired arc. To operate a valve thus equipped, it becomes necessary for the operator to use both hands; one hand to raise the plunger to disengage the latch and the other to turn the handle. The equipment designer in these cases must provide room not for just one of the operator's hands, but for both of them.

OBJECT OF THE INVENTION

Accordingly, it is an object of the present invention to provide a latching handle which may be assembled and installed on a valve in any of several different ways in order to meet any of a large variety of commonly encountered handle repositioning requirements.

Another object of the invention is to provide a latching handle which may be used to operate a valve in the conventional manner as well, if so assembled and installed.

SUMMARY OF THE INVENTION

According to the invention, there is provided a fluid control valve comprising a quarter-turn valve having a valve body and a valve stem, said valve stem defining a longitudinal axis; and, a handle to rotate said valve stem through an arc of operation by way of an indexing means, said arc of operation being bound within a quadrant of a cartesian coordinate system originating at said valve stem axis; said indexing means being non-rotatably engaged with said valve stem and including means for selectively orienting said arc about said valve stem axis.

According to the invention there is also provided a a kit of parts for an indexable latching handle assembly for a quarter-turn rotary valve having a valve body and a valve stem, said kit comprising a handle and an indexing means, said handle when fastened, by way of said indexing means, to said valve stem rotates said valve stem through an arc of operation, said arc of operation being bound within a quadrant of a cartesian coordinate system originating at a longitudinal axis of said valve stem, when assembled said indexing means having means to non-rotatably engage said valve stem and including means for selectively orienting said arc about said valve stem axis.

According to the invention there is also provided a a method of assembling a fluid control valve with an indexable latching handle assembly comprising a quarter-turn valve having a valve body and a valve stem defining an axis, said valve stem being rotatable by a handle through an arc of operation, said arc of operation being bound within a quadrant of a cartesian coordinate system originating at said valve stem axis, said method comprising the steps of a) providing a handle to rotate said valve stem by way of an indexing means; b) selecting said quadrant in which said handle is to operate; and, c) providing a latching means for latching said handle in at least one of a clockwise and counterclockwise latched position thereby preventing rotation of said valve stem and for manually releasing said handle thereby permitting rotation of said handle away from said latched position.

BRIEF DESCRIPTION OF THE DRAWINGS

The invention will now be described, by way of example, with reference to the accompanying drawings, in which:

FIGS. 5a–5c are perspective views of the present invention shown in assembled form showing the unlatching of the latch assembly;

FIGS. 6a–6f are diagrammatic views of the present invention showing the re-indexing of the various handle orientations and associated arcs of operation in one quadrant of adjustment.

DETAILED DESCRIPTION OF THE INVENTION

Figure 1:
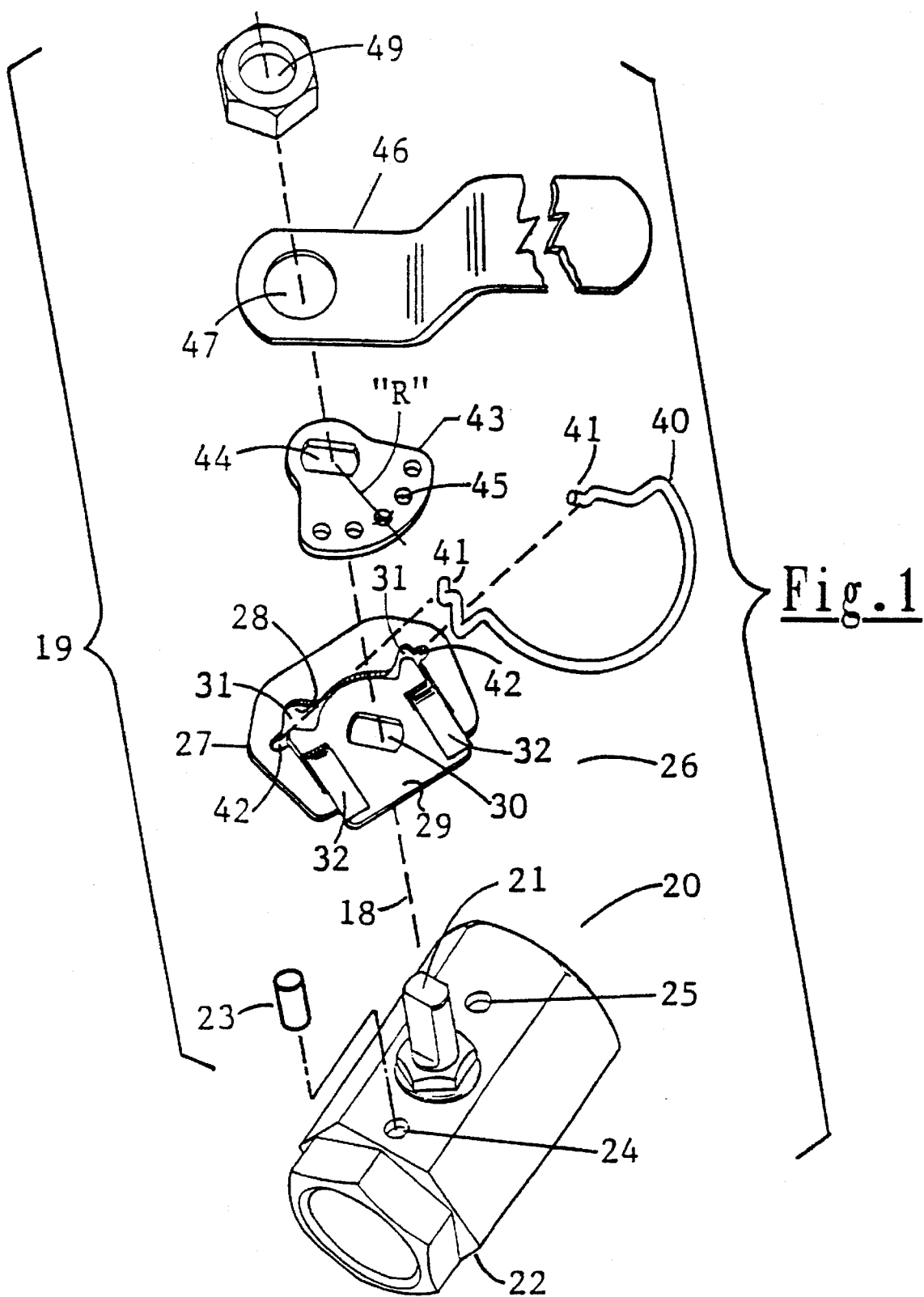
FIG. 1 is an exploded perspective view of a quarter turn valve of the present invention showing the indexable latching handle assembly.

Referring to FIGS. 1–4 there is shown the indexable latching handle assembly 19 and a ball valve 20, with the components exploded (FIG. 1) along the longitudinal axis 18 of the valve stem 21. The valve body 22 has a cylindrical pin 23 extending parallel to the axis of the valve stem 21, press-fitted, when assembled, into a blind hole 24; a second blind hole 25 is provided in the valve body 22 on an opposite side of the valve stem 21 so that the user may install pin 23 in blind hole 25 when needed.

Figure 2:
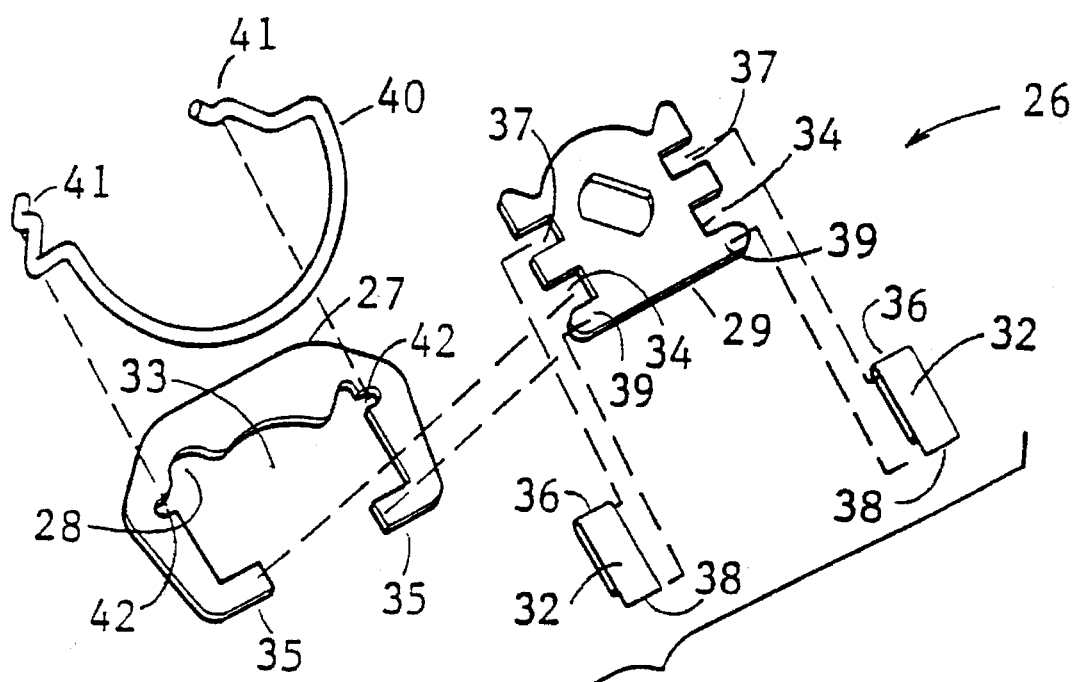
FIG. 2 is an exploded perspective view of the latch assembly used to latch the valve in its closed position.

Latch assembly 26 comprises a) planar latch plate 27 having a clearance notch 28, b) planar stop plate 29 having a shaped opening 30 and ear portions 31, and c) U-shaped spring clips 32 for urging latch plate 27 into a plane common to the stop plate 29. FIG. 2 shows the latch assembly 26 in exploded view. Stop plate 29 is placed in the opening 33 such that opening portion 34 of stop plate 29 engages inward facing tabs 35 of latch plate 27. U-shaped spring clips 32 are fitted in stop plate 29 such that the top portion 36 of spring clips 32 extend through opening 37 of stop plate 29 while the bottom portion 38 of spring clips 32 lie on top of tabs 39 of stop plate 29. The spring clips 32 locate the latch plate 27 relative to the stop plate 29 and act as hinges permitting the latch plate 27 to pivot through a small arc about its inward facing tabs 35 while providing a spring bias urging latch plate 27 and stop plate 29 to remain in the same plane. The inward facing tabs 35 and mating opening portion 34 serve to prevent rotation of the latch plate 27 relative to the stop plate 29 about the axis 18 of the valve stem 21.

Figure 3:
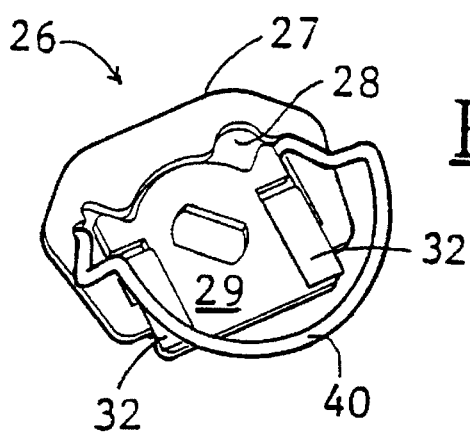
FIG. 3 is an assembled view of the latch assembly used to latch the valve in its open position.
Figure 4:
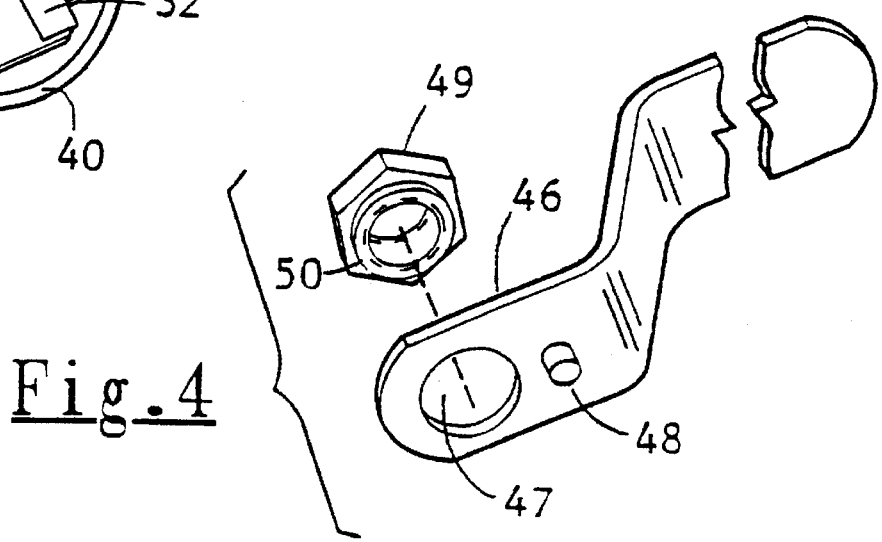
FIG. 4 is an underside perspective view of the handle and a handle retaining nut.

The latch assembly 26 shown in FIG. 2 engages pin 23 when the ball valve 20 is in the closed position. As shown in FIG. 3, the latch plate 27 is inverted such that clearance notch 28 is on the opposite side as that shown in FIGS. 1 and 2. Accordingly, the assembled latch assembly 26 shown in FIG. 3 engages pin 23 when the valve is in the open position. Of course, as would be apparent to one of ordinary skill in the art, the latch plate 27 may be modified to latch in both the open and closed positions if so desired by providing a clearance notch 28 in the latch plate 27 at both sides.

The latch assembly 26 also includes release bail 40 having end portions 41 which snap into and are held fast in notches 42 in latch plate 27. The release bail 40 acts as a moment arm which allows that latch plate 27 to pivot about stop plate 29 when the release bail 40 is depressed (see FIGS. 5a–5c). The latch assembly 26 is assembled on to the valve stem 21 such that the shaped opening 30 engages valve stem 21 to prevent relative rotation therebetween about axis 18.

Next, a planar index plate 43 having a shaped opening 44 and five evenly spaced index holes 45 is also fitted over the valve stem 21. The shaped opening 44 engages valve stem 21 to prevent rotation therebetween about axis 18. The holes 45 lie in an arc adjacent the shaped opening 44, the arc being centered on the axis 18. The length of the arc subtends an angle of about 90° about axis 18.

The outer periphery of the index plate 43 is shaped so as not to interface with the movement of the latch plate 27 relative to the stop plate 29 upon disengaging the latch assembly 26 from pin 23. (See FIGS. 5a–5c). Thus, the shaped openings in the index plate 43 and stop plate 29 are such that, when assembled, the plates may be oriented in the same relative direction to one another as shown in FIG. 1.

The handle 46, having a hole 47 and a lug 48 located on the underside of handle 46 (see FIG. 4), is then installed in a desired orientation by placing the hole 47 over the valve stem 21 and engaging the lug 48 in a desired index hole 45 in index plate 43. The spacing from the center of hole 47 to the center of lug 48 is equal to the radius "R" from the center of the shaped opening 44 of index plate 43 to the centers of the holes 45. The assembly is completed by tightening the nut 49 which engages screw threads on the valve stem 21. The underside of nut 49 carries an annular boss 50 (see FIG. 4) for aiding in locating the handle 46 on the valve stem 21 by engaging the hole 47 in handle 46.

The completed assembly is shown in FIG. 5a. Here, it is shown that the pin 23 is entrapped between the ear portion 31 of the stop plate 29 and the clearance notch 28 in the latch plate 27. The indexable latching handle assembly 19 is held fast when in this position and may not be rotated in either direction (clockwise or counterclockwise) until the latch assembly 26 is released.

Turning now to FIGS. 5b and 5c, there is shown the operation of the indexable latching handle assembly 19. To release the latch assembly 26, and thus rotate the indexable latching handle assembly 19 and valve stem 21, the release bail 40 is depressed by the valve operator. Depressing the release bail 40 pivots latch plate 27 about stop plate 29 so that clearance notch 28 clears pin 23 (see FIG. 5b, where only the indexable latching handle assembly 19 and part of the ball valve 20 is shown for clarity). Once rotation of the handle 46 is underway, the release bail 40 may be released by the operator as the latch plate 27 will be held in the released position and will slide along the top of the pin 23. Operation of the ball valve 20 is complete when the ear portion 31 of the stop plate 29 contacts pin 23 at the far end of the handle stroke (FIG. 5c) thereby preventing further rotation. When the ball valve 20 is subsequently operated from open to closed, the latch plate 27 will automatically re-engage pin 23 at the end of the stroke.

Turning now to FIGS. 6a–6f there is shown the use and purpose of the index plate 43. FIG. 6a illustrates the positions in which the handle may be installed, determined by selecting one of a plurality of index holes 45 in the index plate 43 to be engaged by the lug 48 extending from the under surface of the handle 46. FIGS. 6b–6f depicts the handle 46 installed in each of these positions, respectively; each installation is shown with its corresponding arc of operation. If the lug 46 was successively engaged in each of the index holes 45 in the index plate 43 beginning in the first of five index holes 45, for example, and proceeding counterclockwise to the last hole 45, it would move 90° in 22.5° increments. In the counterclockwise-most position (shown in FIG. 6f) the orientation of the handle 46 is the reverse of the recognized convention (that the axis of the handle 46 align with the longitudinal axis of the ball valve 20 when in the open position). This is known as "reversed handle" in the industry. The conventional sense of operation, i.e. "clockwise-to-close", is shown in FIG. 6b. In each of FIGS. 6b–6f, the handle 46 shown in solid form is shown in the closed position.

The orientation of the handle 46 relative to the index plate 43 must be determined at assembly. That is, the user selects a particular orientation of FIGS. 6b–6f so that lug 48 engages within the corresponding index hole 45 in index plate 43. Once selected, the nut 49 firmly holds handle 46 against the index plate 43. The indexing feature is distinguished from the latching assembly 26 which is used to permit rotation of the entire latching handle assembly 19 (together with the valve stem 21) relative to the valve body 22 (i.e. opening and/or closing the ball valve 20) whereas the indexable feature allows selective orientation of the handle 46 relative to the valve stem 21 within the arc of operation.

Turning now to FIGS. 7–10, there is shown variations in the latching handle assembly 19 which permit operation of the ball valve 20 in all four quadrants of a cartesian coordinate system. In each diagrammed variation, the lug 48 has been engaged in the first index hole 45 as shown in FIG. 6b. Thus, the closed position is shown in solid form where the handle 46 is perpendicular to the longitudinal axis of the ball valve 20, (e.g. "clockwise-to-close"). In FIGS. 7a and 8a, pin 23 is installed in blind hole 24 (see FIG. 1); in FIGS. 9a and 10a, pin 23 is installed blind hole 25.

Figure 7A:
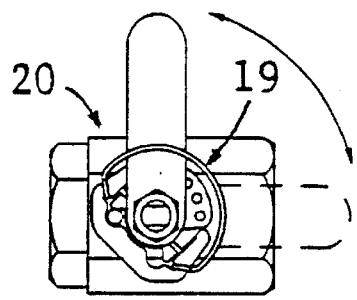
FIGS. 7–10 are diagrammatic views of the present invention showing the various arrangements of the handle necessary to operate in the four quadrants of a cartesian coordinate system.
Figure 7B:
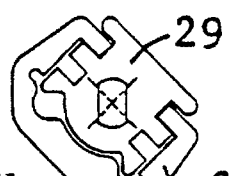
Figure 7C:
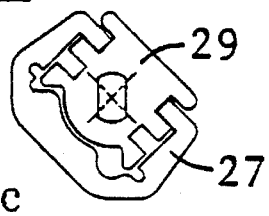
Figure 8A:
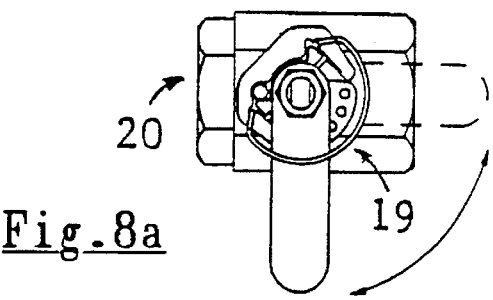
Figure 8B:
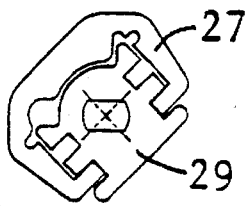
Figure 8C:
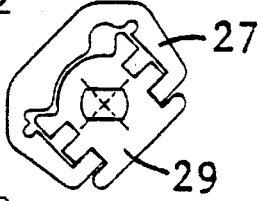
Figure 9A:
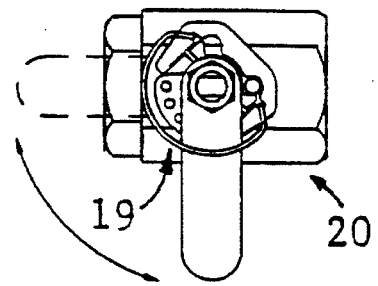
Figure 9B:
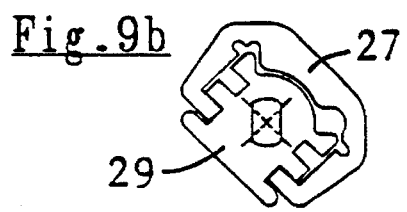
Figure 9C:
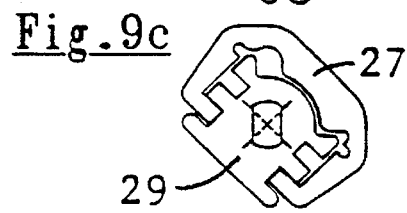
Figure 10A:
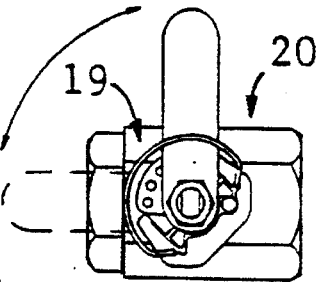
Figure 10B:
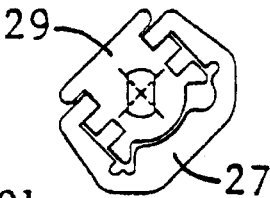
Figure 10C:
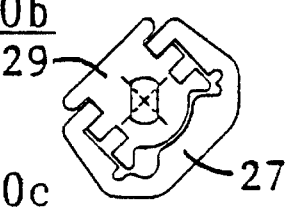

In each of the figures labeled "b" and "c" there is shown the latch plate 27 and stop plate 29 oriented to achieve, in figures labeled "b", latched closed; and, in figures labeled "c", latched open. As previously mentioned, to change the orientation from open to closed, latch plate 27 merely need be inverted with respect to stop plate 29 and pin 23 be relocated in blind hole 25. The latch plate 27 and stop plate 29 shown in FIGS. 7b and 7c (and FIGS. 9b and 9c) are the same as shown in FIGS. 8b and 8c (and FIGS. 10b and 10c), respectively, merely rotated 90° where the latch plate 27 is inverted. The latch plate 27 and stop plate 29 shown in FIGS. 9b and 9c (and FIGS. 10b and 10c) are the same as that shown in FIGS. 7b and 7c (and FIGS. 8b and 8c), respectively, merely turned 180°. For example, FIG. 7a shows the ball valve 20 in the latched closed position operating in the first quadrant with pin 23 in blind hole 24 and requiring clockwise rotation of handle 46 to open the ball valve 20. FIG. 8a shows the ball valve 20 in the latched closed position operating in the second quadrant with pin 23 in blind hole 24 and requiring counterclockwise rotation of handle 46 to open the ball valve 20. FIG. 9a shows the ball valve 20 in the latched closed position operating in the third quadrant with pin 23 in blind hole 25 and requiring clockwise rotation of handle 46 to open the ball valve 20. FIG. 10a shows the ball valve 20 in the latched closed position operating in the fourth quadrant with pin 23 in blind hole 25 and requiring counterclockwise rotation of handle 46 to open the ball valve 20. Thus, each of these figures (FIGS. 7a, 8a, 9a and 10a) are utilizing the orientation of the latch plate 27 and stop plate 29 shown in the figures labeled "b" (FIGS. 7b, 8b, 9b and 10b, respectively). The latched open position is not shown in FIGS. 7a, 8a, 9a and 10a. However, to obtain a latched open position, the latch plate 27 and stop plate 29 depicted in the figures labeled "c" may be used.

Thus, it can be readily seen that the particular orientation described with reference to FIGS. 7–10, together with the orientation provided by the index plate 43 as described with reference to FIGS. 6a–6f, offer a very versatile re-indexable latching handle assembly capable of operating through the standard 90° arc originating at a position anywhere (in this example, every 22.5°) about the valve stem 21, and allowing either clockwise or counterclockwise rotation to open ball valve 20.

What is claimed is:

1. A fluid control valve comprising:

a quarter-turn valve having a valve body and a valve stem, said valve stem defining a longitudinal axis; and, a handle to rotate said valve stem through an arc of operation by way of an indexing means, said arc of operation being bound within a quadrant of a cartesian coordinate system originating at said valve stem axis; said indexing means being non-rotatably engaged with said valve stem for rotation therewith and including means for selectively positioning said arc of operation at a plurality of orientations about said valve stem axis.

2. The valve according to claim 1 wherein said indexing means comprises:

an index plate having a shaped opening to engage a corresponding shape of said valve stem to preclude relative rotation therebetween and a plurality of index holes lying in an arc adjacent said shaped opening centered on said axis, said index plate engaging said valve stem; and, a lug located on said handle and protruding therefrom, said lug engaging a selected one of said index holes.

3. The valve according to claim 1 further comprising a latching means for latching said handle in at least one of a clockwise and counterclockwise latched position thereby preventing rotation of said valve stem and for manually releasing said handle thereby permitting rotation of said handle away from said latched position.

4. The valve according to claim 3 wherein said latching means comprises:

a pin engaged in a hole, said pin defining a longitudinal axis substantially parallel to said valve stem axis; and, a latching assembly resiliently releasably engaging said pin.

5. The valve according to claim 3 wherein said latching means comprises:

a latch plate having an opening, including a notch shaped to provide engagement with a stop fast with said valve body;

a stop plate having a) a shaped opening to engage a corresponding shape of said valve stem to preclude relative rotation therebetween, at least a portion of said stop plate being located within said opening in said latch plate and b) stop means preventing further rotation of said handle at both ends of a desired handle rotation about said axis; and a biasing means for locating said latch plate relative to said stop plate and for permitting said latch plate to move relative to said stop plate to release said engagement while biasing said latch plate and said stop plate to remain in the same plane.

6. The valve according to claim 5 wherein said latching means further comprises a release means for manually releasing said latching means from said pin.

7. The valve according to claim 5 wherein said resilient biasing means is at least one spring clip.

8. The valve according to claim 6 wherein said indexing means comprises:

an index plate having a shaped opening to engage a corresponding shape of said valve stem to preclude relative rotation therebetween and a plurality of index holes lying in an arc adjacent said shaped opening centered on said axis, said index plate engaging said valve stem; and, a lug located on said handle and protruding therefrom, said lug engaging a selected one of said index holes.

9. The valve according to claim 6 wherein the index plate is constructed to place the arc in any one of the four quadrants about said valve stem.

10. The valve according to claim 3 wherein said latching means may be selectably located about said valve stem in any one of four evenly spaced locations.

11. A kit of parts for an indexable latching handle assembly for a quarter-turn rotary valve having a valve body and a valve stem, said kit comprising a handle and an indexing means, said handle when fastened, by way of said indexing means, to said valve stem rotates said valve stem through an arc of operation, said arc of operation being bound within a quadrant of a cartesian coordinate system originating at a longitudinal axis of said valve stem, when assembled said indexing means having means to non-rotatably engage said valve stem and including means for selectively orienting said arc, about said valve stem axis.

12. The kit according to claim 11 wherein said indexing means comprises:

an index plate having a shaped opening which when attached to said valve stem engages a corresponding shape of said valve stem to preclude relative rotation therebetween, said index plate having a plurality of index holes lying in an arc adjacent said shaped opening centered on said axis; and, a lug located on said handle and protruding therefrom which, when said kit is assembled to said valve stem, engages a selected one of said index holes.

13. The kit according to claim 11 further comprising a latching means which when assembled to said valve, latches said handle in at least one of a clockwise and counterclockwise latched position thereby preventing rotation of said valve stem and manually releases said handle thereby permitting rotation of said handle away from said latched position.

14. The kit according to claim 13 wherein said latching means comprises:

a stop which when fastened to said valve body provides at least one of a clockwise and counterclockwise latched position;

a latch plate having an opening, including a notch which when assembled to said valve is shaped to provide engagement with a said stop;

a stop plate having a) a shaped opening which when assembled to said valve engages a corresponding shape of said valve stem to preclude relative rotation therebetween, at least a portion of said stop plate being located within said opening in said latch plate and b) stop means which when assembled to said valve stem prevents further rotation of said handle at both ends of a desired handle rotation about said axis; and a biasing means which when assembled locates said latch plate relative to said stop plate and permits said latch plate to move relative to said stop plate to release said engagement while biasing said latch plate and said stop plate to remain in the same plane.

15. The kit according to claim 14 wherein said latching means further comprises a release means which when assembled to said latching means manually releases said latching means from said stop.

16. The kit according to claim 14 wherein said resilient biasing means is at least one spring clip.

17. A method of assembling a fluid control valve with an indexable latching handle assembly comprising a quarter-turn valve having a valve body and a valve stem defining an axis, said valve stem being rotatable by a handle through an arc of operation, said arc of operation being bound within a quadrant of a cartesian coordinate system originating at said valve stem axis, an indexing means being non-rotatably engaged with said valve stem for rotation therewith and including means for selectively positioning said arc of operation of a plurality of orientations about said valve stem axis, said method comprising the steps of:

a) providing a handle to rotate said valve stem by way of said indexing means;

b) selecting said quadrant in which said handle is to operate; and, c) providing a latching means for latching said handle in at least one of a clockwise and counterclockwise latched position thereby preventing rotation of said valve stem and for manually releasing said handle thereby permitting rotation of said handle away from said latched position.

18. The method according to claim 17 wherein providing said indexing means comprises the steps of:

a) attaching an index plate to said valve stem, said index plate having a shaped opening to engage a corresponding shape of said valve stem to preclude relative rotation therebetween and a plurality of index holes lying in an arc adjacent said shaped opening;

b) orienting said handle relative to said index plate and said valve stem thereby allowing a lug on said handle to engage a selected one of said index holes.

19. The method according to claim 17 wherein providing said latching means comprises a) providing a stop fast with said valve body adjacent said valve stem;

b) attaching a latch plate having an opening, including a notch shaped to provide engagement with said stop to a stop plate, said stop plate having a) a shaped opening to engage a corresponding shape of said valve stem to preclude relative rotation therebetween, at least a portion of said stop plate being located within said opening in said latch plate and b) stop means preventing further rotation of said handle at both ends of a desired handle rotation about said axis;

c) attaching a biasing means for locating said latch plate relative to said stop plate and for permitting said latch plate to move relative to said stop plate to release said engagement while biasing said latch plate and said stop plate to remain in the same plane.

d) attaching said stop plate and said latch plate to said valve stem.

20. The method according to claim 17 further comprising the step of attaching a releasing means to said latching means for manually releasing said latching means thereby permitting rotation of said handle.

* * * * *